US008518310B2

(12) United States Patent
Koumoto et al.

(10) Patent No.: US 8,518,310 B2
(45) Date of Patent: Aug. 27, 2013

(54) PROCESS FOR PRODUCING A DRIED COMPOSITE SEMIPERMEABLE MEMBRANE

(75) Inventors: Atsuhito Koumoto, Ibaraki (JP); Takashi Kamada, Ibaraki (JP); Tomomi Ohara, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 1507 days.

(21) Appl. No.: 11/869,568

(22) Filed: Oct. 9, 2007

(65) Prior Publication Data
US 2008/0251447 A1 Oct. 16, 2008

(30) Foreign Application Priority Data

Oct. 10, 2006 (JP) ................................. 2006-276656

(51) Int. Cl.
B32B 37/14 (2006.01)
B01D 39/00 (2006.01)

(52) U.S. Cl.
USPC ..................... 264/45.5; 210/500.38; 210/639; 210/634

(58) Field of Classification Search
USPC ............ 210/500.38, 639, 634, 746; 264/45.5
See application file for complete search history.

(56) References Cited

U.S. PATENT DOCUMENTS

| 2,727,087 | A | 12/1955 | Hull |
| 3,023,300 | A | 2/1962 | Lehnert |
| 3,133,132 | A | 5/1964 | Loeb et al. |
| 3,133,137 | A | 5/1964 | Loeb et al. |
| 3,567,632 | A | 3/1971 | Richter et al. |
| 3,744,642 | A | 7/1973 | Scala et al. |
| 4,005,012 | A | 1/1977 | Wrasidlo |
| 4,277,344 | A | 7/1981 | Cadotte |
| 4,520,044 | A | 5/1985 | Sundet |
| 4,529,646 | A | 7/1985 | Sundet |
| 4,761,234 | A | 8/1988 | Uemura et al. |
| 4,769,148 | A * | 9/1988 | Fibiger et al. ............ 210/500.38 |
| 4,830,885 | A | 5/1989 | Tran et al. |
| 4,872,984 | A | 10/1989 | Tomaschke |
| 4,938,872 | A | 7/1990 | Strantz et al. |
| 4,948,507 | A | 8/1990 | Tomaschke |
| 4,950,404 | A | 8/1990 | Chau |
| 4,983,291 | A | 1/1991 | Chau et al. |
| 5,152,910 | A | 10/1992 | Hodgdon |
| 5,173,335 | A | 12/1992 | Arthur |
| 5,234,598 | A | 8/1993 | Tran et al. |
| 5,254,261 | A | 10/1993 | Tomaschke et al. |
| 5,693,227 | A | 12/1997 | Costa |
| 5,746,916 | A | 5/1998 | Kamo et al. |
| 5,783,079 | A | 7/1998 | Kumano et al. |
| 6,015,495 | A | 1/2000 | Koo et al. |
| 6,132,804 | A | 10/2000 | Rice et al. |
| 6,177,011 | B1 | 1/2001 | Hachisuka et al. |
| 6,413,425 | B1 * | 7/2002 | Hachisuka et al. ...... 210/500.38 |
| 6,536,605 | B2 | 3/2003 | Rice et al. |
| 6,551,536 | B1 | 4/2003 | Kwak et al. |
| 2002/0063093 | A1 | 5/2002 | Rice et al. |
| 2004/0222146 | A1 | 11/2004 | Hirose et al. |
| 2008/0053893 | A1 | 3/2008 | Ohara et al. |
| 2008/0083670 | A1 | 4/2008 | Ohara et al. |
| 2008/0257818 | A1 | 10/2008 | Konishi et al. |
| 2008/0277334 | A1 | 11/2008 | Ohara et al. |
| 2009/0050558 | A1 | 2/2009 | Ishizuka et al. |
| 2010/0044902 | A1 | 2/2010 | Ohara et al. |
| 2010/0173083 | A1 | 7/2010 | Ohara et al. |
| 2010/0176052 | A1 | 7/2010 | Koumoto et al. |

FOREIGN PATENT DOCUMENTS

| CA | 2045109 | 12/1992 |
| EP | 0394 038 | 4/1990 |
| EP | 0 523 295 A1 | 1/1993 |
| JP | 53-016373 | 2/1978 |
| JP | 55-147106 | 11/1980 |
| JP | 58-180206 | 10/1983 |
| JP | 61-42308 | 2/1986 |
| JP | 61-046207 | 3/1986 |
| JP | 62-121603 | 6/1987 |
| JP | 62-197105 | 8/1987 |
| JP | 63-218208 | 9/1988 |
| JP | 2-78428 | 3/1990 |
| JP | 2-187135 | 7/1990 |

(Continued)

OTHER PUBLICATIONS

File History of the related U.S. Appl. No. 11/664,428, as of Mar. 14, 2008.
File History of the related U.S. Appl. No. 11/664,371, as of Mar. 14, 2008.
File History of the related U.S. Appl. No. 11/664,254, as of Mar. 14, 2008.
File History of the related U.S. Appl. No. 11/869,678, as of Mar. 14, 2008.
File History of the related U.S. Appl. No. 11/664,428, for the period of Jan. 20, 2009-May 5, 20009.

(Continued)

Primary Examiner — Katherine Zalasky
(74) Attorney, Agent, or Firm — Knobbe, Martens, Olson & Bear, LLP

(57) ABSTRACT

The present invention aims at providing a process for producing a dried composite semipermeable membrane having extremely small content of unreacted components, outstanding water permeability and salt-blocking rate even after drying treatment, and outstanding contamination resistance and durability. The present invention relates to a process for producing a dried composite semipermeable membrane comprising the steps of: preparing a composite semipermeable membrane having a skin layer including a polyamide resin obtained by reaction between a polyfunctional amine component and a polyfunctional acid halide component formed on the surface of a porous support; washing the composite semipermeable membrane; contacting a moisturing solution including a moisturizer and a hydrophilization agent only to the surface of the porous support of the washed composite semipermeable membrane and contacting a protecting solution only to the surface of the skin layer of the washed composite semipermeable membrane; and drying the treated composite semipermeable membrane.

14 Claims, No Drawings

(56) References Cited

FOREIGN PATENT DOCUMENTS

| | | |
|---|---|---|
| JP | 5-023558 | 2/1993 |
| JP | 2510530 B | 4/1996 |
| JP | 8-509162 | 10/1996 |
| JP | 10-165789 | 6/1998 |
| JP | 2947291 | 7/1999 |
| JP | 11-319517 | 11/1999 |
| JP | 2000-24470 | 1/2000 |
| JP | 3015853 | 3/2000 |
| JP | 3525759 | 4/2000 |
| JP | 2000-153137 | 6/2000 |
| JP | 2000-300974 | 10/2000 |
| JP | 2000-325759 | 11/2000 |
| JP | 2000-350928 | 12/2000 |
| JP | 2001-038175 | 2/2001 |
| JP | 2001-179061 | 7/2001 |
| JP | 2001-286741 | 10/2001 |
| JP | 2002-095939 | 4/2002 |
| JP | 2002-136849 | 5/2002 |
| JP | 2002-177750 | 6/2002 |
| JP | 2002-516743 | 6/2002 |
| JP | 2002-355938 | 12/2002 |
| JP | 3379963 | 12/2002 |
| JP | 2003-275652 | 9/2003 |
| JP | 2003-320224 | 11/2003 |
| JP | 2005-066464 | 3/2005 |
| JP | 2005-137964 | 6/2005 |
| JP | 2006-122887 | 5/2006 |
| JP | 2006-272148 | 10/2006 |
| WO | WO 91/03311 | 3/1991 |
| WO | WO 99/62623 | 12/1999 |
| WO | WO 94/23943 | 10/2004 |

OTHER PUBLICATIONS

File History of the related U.S. Appl. No. 11/664,371, for the period of Jan. 20, 2009-May 5, 2009.
File History of the related U.S. Appl. No. 11/664,254, for the period of Jan. 20, 2009-May 5, 2009.
File History of the related U.S. Appl. No. 11/576,598, for the period of Jan. 20, 2009-May 5, 2009.
File History of the related U.S. Appl. No. 11/869,678, for the period of Jan. 20, 2009-May 5, 2009.
Chinese Office Action issued on the related Chinese Patent Application No. 200580032709.9, dated Jul. 18, 2008.
International Search Report issued on the related PCT Application No. PCT/JP2005/017829, dated Dec. 6, 2005.
Supplementary European Search Report issued on the related European Application No. 05782337.9, dated Apr. 7, 2008.
Supplementary European Search Report issued on the corresponding European Application No. 05781415.4, dated Apr. 7, 2008.
Supplementary European Search Report issued on the related European Application No. 05787916.5, dated Apr. 17, 2008.
File History of the related U.S. Appl. No. 11/664,428, for the period of Mar. 15, 2008-Sep. 19, 2008.
File History of the related U.S. Appl. No. 11/664,371, for the period of Mar. 15, 2008-Sep. 19, 2008.
File History of the related U.S. Appl. No. 11/664,254, for the period of Mar. 15, 2008-Sep. 19, 2008.
File History of the related U.S. Appl. No. 11/576,598, as of Sep. 19, 2008.
File History of the related U.S. Appl. No. 11/869,678, for the period of Mar. 15, 2008-Sep. 19, 2008.
International Preliminary Report on Patentability issued on the related PCT Application No. PCT/JP2005/016618, dated Apr. 3, 2007.
International Preliminary Report on Patentability issued on the related PCT Application No. PCT/JP2005/016618, dated Apr. 11, 2007.
International Preliminary Report on Patentability issued on the related PCT Application No. PCT/JP2005/ 016247, dated Apr. 3, 2007.
International Preliminary Report on Patentability issued on the related PCT Application No. PCT/JP2005/016247, dated Apr. 11, 2007.
International Preliminary Report on Patentability issued on the related PCT Application No. PCT/JP2005/016617, dated Apr. 3, 2007.
International Preliminary Report on patentability issued on the related PCT Application No. PCT/JP2005/016617, dated Apr. 11, 2007.
International Search Report issued on the related PCT Application No. PCT/JP2005/016618, dated Dec. 6, 2005.
International Search Report issued on the related PCT Application No. PCT/JP2005/016247, dated Oct. 4, 2005.
International Search Report issued on the related PCT Application No. PCT/JP2005/016617, dated Dec. 6, 2007.
File History of the related U.S. Appl. No. 11/664,428, for the period of Sep. 20, 2008-Jan. 19, 2009.
File History of the related U.S. Appl. No. 11/664,371, for the period of Sep. 20, 2008-Jan. 19, 2009.
File History of the related U.S. Appl. No. 11/664,254, for the period of Sep. 20, 2008-Jan. 19, 2009.
File History of the related U.S. Appl. No. 11/576,598, for the period of Sep. 20, 2008-Jan. 19, 2009.
File History of the related U.S. Appl. No. 11/869,678, for the period of Sep. 20, 2008-Jan. 19, 2009.
Chinese Office Action issued on the corresponding Chinese Patent Application No. 2000710180103.0, dated Dec. 7, 2010.
File History of the related U.S. Appl. No. 11/664,428, for the period of May 6, 2009-Aug. 4, 2010.
File History of the related U.S. Appl. No. 12/728,347, as of Aug. 4, 2010.
File History of the related U.S. Appl. No. 11/664,371, for the period of May 6, 2009-Aug. 4, 2010.
File History of the related U.S. Appl. No. 11/664,254, for the period of May 6, 2009-Aug. 4, 2010.
File History of the related U.S. Appl. No. 11/576,598, for the period of May 6, 2009-Aug. 4, 2010.
File History of the related U.S. Appl. No. 11/869,678, for the period of May 6, 2009-Aug. 4, 2010.
File History of the related U.S. Appl. No. 12/606,518, as of Aug. 4, 2010.
File History of the related U.S. Appl. No. 12/593,844, as of Aug. 4, 2010.

* cited by examiner

PROCESS FOR PRODUCING A DRIED COMPOSITE SEMIPERMEABLE MEMBRANE

This application claims priority to Japanese Patent Application No. 2006-276656, filed Oct. 10, 2006. The aforementioned application is hereby incorporated by reference in its entirety.

FIELD OF THE INVENTION

The present invention relates to a dried composite semipermeable membrane having a skin layer which includes a polyamide resin and a porous support that supports the skin layer, and to a process for producing the dried composite semipermeable membrane. The dried composite semipermeable membranes are suitably used for production of ultrapure water, desalination of brackish water or sea water, etc., and usable for removing or collecting pollution sources or effective substances from pollution, which causes environment pollution occurrence, such as dyeing drainage and electrodeposition paint drainage, leading to contribute to closed system for drainage. Furthermore, the membrane can be used for concentration of active ingredients in foodstuffs usage, for an advanced water treatment, such as removal of harmful component in water purification and sewage usage etc.

DESCRIPTION OF THE RELATED ART

Recently, many composite semipermeable membranes, in which a skin layer includes polyamides obtained by interfacial polymerization of polyfunctional aromatic amines and polyfunctional aromatic acid halides and is formed on a porous support, have been proposed (patent Document 1 to 4). A composite semipermeable membrane, in which a skin layer includes a polyamide obtained by interfacial polymerization of a polyfunctional aromatic amine and a polyfunctional alicyclic acid halide and is formed on a porous support, has been also
proposed (patent Document 5).

However, when it is needed to obtain a target compound condensed or refined as permeated liquid or non-permeated liquid using conventional semipermeable membranes in actual cases, there has occurred problems that unreacted components eluted or flowing out from parts constituting the membrane or the membrane module may reduce purity of the targeted compound. In order to solve with this problem, sufficient washing is given to these semipermeable membranes and membrane modules in advance of use, but this washing operation generally may take long time or need high energy and, may reduce membrane performances, such as flux of the membrane.

There have been proposed a process of processing the membrane with a solution of sodium hydrogensulfite of 0.01 to 5% by weight, at a temperature from approximately 20 to 100° C., for approximately 1 to 60 minutes in order to remove unreacted components from the semipermeable membrane (patent Document 6), a process of removing unreacted residual materials by contact of an organic material aqueous solution to a composite semipermeable membrane (patent Document 7), and a process of extracting excessive components remaining in the base material by successive bath of citric acid, bleaching agents, and the like (patent Document 8).

A process of manufacturing a fluid separation membrane, in which unreacted aromatic monomers can be removed by washing with a cleaning liquid at a temperature of 50° C. or more, has been proposed (patent Document 9).

On the other hand, from viewpoints of subsequent workability, preservability, etc., the composite semipermeable membrane produced is preferably a dried composite semipermeable membrane. However, when a composite semipermeable membrane having a skin layer formed on the surface of the porous support is dried, there has occurred a problem of deterioration of salt-blocking performance and permeation flux, compared with characteristics before drying. A technique in which a reverse osmosis membrane is dried after hydrophilization treatment for the purpose of solving the problem has been disclosed (patent Document 10). Furthermore, a method of drying a composite membrane after immersion treatment in a solution of saccharides having a molecular weight of 1000 or less has been disclosed (patent Document 11).

In order to obtain a dried composite reverse osmosis membrane having outstanding water permeability, organic matter blocking performance, and salt-blocking performance, a method of performing heat drying treatment of a compound reverse osmosis membrane after contact to an aqueous solution at a temperature of 40 to 100° C. has been disclosed (patent Document 12).

However, when, after a washing treatment for removing unreacted components from the composite semipermeable membrane comprising a porous support having a skin layer formed on the surface thereof, the washed composite semipermeable membrane is applied to a hydrophilization treatment, an immersion treatment, etc., as described in patent Document 10 to 12, and is dried, there has occurred a problem of great deterioration of salt-blocking property and permeation flux of the dried composite semipermeable membrane obtained, compared with that of the composite semipermeable membrane before drying treatment. The deterioration of the permeation flux is particularly significant.

Furthermore, in order to improve contamination resistance and durability, a technique of forming a protective layer on the surface of a separation active layer is proposed (patent Document 13 and 14).

[Patent Document 1] Japanese Patent Application Laid-Open No. 55-147106
[Patent Document 2] Japanese Patent Application Laid-Open No. 62-121603
[Patent Document 3] Japanese Patent Application Laid-Open No. 63-218208
[Patent Document 4] Japanese Patent Application Laid-Open No. 02-187135
[Patent Document 5] Japanese Patent Application Laid-Open No. 61-42308
[Patent Document 6] U.S. Pat. No. 2,947,291 specification
[Patent Document 7] Japanese Patent Application Laid-Open No. 2000-24470
[Patent Document 8] Published Japanese translation of a PCT application No. 2002-516743
[Patent Document 9] U.S. Pat. No. 3,525,759 specification
[Patent Document 10] Japanese Patent Application Laid-Open No. 2003-320224
[Patent Document 11] U.S. Pat. No. 3,015,853 specification
[Patent Document 12] Japanese Patent Application Laid-Open No. 10-165789
[Patent Document 13] Japanese Patent Application Laid-Open No. 62-197105
[Patent Document 14] U.S. Pat. No. 3,379,963 specification

SUMMARY OF THE INVENTION

The present invention aims at providing a process for producing a dried composite semipermeable membrane having extremely small amount of content of unreacted components, outstanding water permeability and salt-blocking rate even after drying treatment, and outstanding contamination resistance and durability.

As a result of wholehearted investigation performed by the present inventors for attaining the above-described objectives, it has been found out that before drying a washed composite semipermeable membrane, application of a moisturing treatment and a protection treatment to the washed composite semipermeable membrane can produce a dried composite semipermeable membrane having outstanding water permeability and salt-blocking rate even after drying treatment, and outstanding contamination resistance and durability, leading to completion of the present invention.

That is, the present invention relates to a process for producing a dried composite semipermeable membrane comprising the steps of: preparing a composite semipermeable membrane having a skin layer including a polyamide resin obtained by reaction between a polyfunctional amine component and a polyfunctional acid halide component formed on the surface of a porous support; preparing a washed composite semipermeable membrane by washing the composite semipermeable membrane; preparing a treated composite semipermeable membrane
by contact of a moisturing solution including a moisturizer and a hydrophilization agent only to the surface of the porous support of the washed composite semipermeable membrane and by contact of a protecting solution only to the surface of the skin layer of the washed composite semipermeable membrane; and drying the treated composite semipermeable membrane.

When a composite semipermeable membrane without removing unreacted components after production of the composite semipermeable membrane as conventional processes is dried, deterioration in water permeability and salt-blocking rate of the composite semipermeable membrane after drying treatment have been not so serious, although a problem is remained of deterioration of purity of permeated water by elution of the unreacted components. On the other hand, when unreacted components after production of the composite semipermeable membrane are removed and then the composite semipermeable membrane is dried, although a problem of deterioration of purity of the permeated water by elution of the unreacted components may be solved, deterioration in water permeability and salt-blocking rate of the composite semipermeable membrane after drying treatment is very large. Reasons for such a phenomenon is not yet clear. However, some function of the unreacted components included in the composite semipermeable membrane probably may control changes in the structure and physical properties of the porous support, such as contraction of micro pores of the porous support in drying, and repelling of raw water on the surface of the porous support.

In the present invention, a dried composite semipermeable membrane having outstanding water permeability and salt-blocking rate even after drying treatment, and outstanding contamination resistance and durability can be obtained by contact of a moisturing solution to the surface of a porous support of a washed composite semipermeable membrane to apply a moisturing treatment.

Furthermore, in the producing process of the present invention, it is necessary to contact a moisturing solution only to the surface of the porous support of the washed composite semipermeable membrane, and to contact a protecting solution only to the surface of the skin layer of the washed composite semipermeable membrane. Contact of the moisturing solution to the surface of the skin layer not only poses a problem for subsequent formation of the protective layer on the skin layer, but disadvantageously reduces the function as the protective layer. In addition, contact of the protecting solution to the surface of the porous support disadvantageously hampers permeation of the moisturing solution in the subsequent moisturing treatment. Furthermore, performance of the moisturing treatment and the protection treatment (contact of the protecting solution) before removing unreacted components unpreferably makes difficult to remove the unreacted components at the time of the washing treatment.

In the present invention, moisturizers are preferably of organic acid metal salts and/or inorganic acid metal salts.

The organic acid metal salt preferably include at least one kind of organic acid alkali metal salt selected from the group consisting of alkali metal acetate, alkali metal lactate, and alkali metal glutamate. The alkali metal is preferably selected from sodium or potassium.

In addition, the inorganic acid metal salt preferably includes at least one kind of inorganic acid alkali metal salt selected from the group consisting of alkali metal hydrogencarbonate, dialkali metal monohydrogen phosphate, monoalkali metal dihydrogen phosphate. The alkali metal is preferably selected from sodium or potassium.

Although a prolonged moisturing treatment is needed in order to obtain necessary effect when using as surfactants and saccharides as a moisturizer, use of the organic acid metal salts and/or inorganic acid metal salts can give sufficient effect by extremely short-time moisturing treatment, leading to great advantage on the productive process. In addition, although use of the surfactants or saccharides as a moisturizer may give poor effect depending on drying conditions (temperature, period of time, etc.), use of the organic acid metal salts and/or inorganic acid metal salts can provide sufficient effect independently of dry conditions, resulting in great advantage on the productive processes.

It is necessary to add hydrophilization agents to the moisturing solution. Since the moisturing solution without addition of hydrophilization agent cannot sufficiently apply moisturizing effect, the moisturing solution greatly reduces water permeability and salt-blocking rate of the composite semipermeable membrane after the drying treatment. Further, the longer period of time for moisturing treatment make continuous production difficult.

Furthermore, the present invention relates to a dried composite semipermeable membrane obtained by the producing process. The dried composite semipermeable membrane of the present invention has extremely small content of unreacted components, and has outstanding water permeability and salt-blocking rate after drying treatment. Since the dried composite semipermeable membrane of the present invention has a protective layer on the skin layer thereof, the dried composite semipermeable membrane not only allows stable prolonged operation even in the case of treatment of raw water including various membrane contamination substances (for example, surfactants and transition metal components, such as irons) that may cause deterioration of the permeate flow rate, but can reduce damage of the skin layer in the case of preparation of membrane module, leading to improvement in reliability of the product.

BEST MODE FOR CARRYING OUT OF THE INVENTION

The embodiments of the invention will, hereinafter, be described. The process for producing the dried composite semipermeable membrane of the present invention comprises the steps of: preparing a composite semipermeable membrane having a skin layer including a polyamide resin obtained by reaction between a polyfunctional amine component and a polyfunctional acid halide component formed on the surface of a porous support to prepare a composite semipermeable membrane; preparing a washed composite semipermeable membrane by washing the composite semipermeable membrane; preparing a treated composite semipermeable membrane by contact of a moisturing solution including a moisturizer and a hydrophilization agent only to the surface of the porous support of the washed composite semipermeable membrane and by contact of a protecting solution only to the surface of the skin layer of the washed composite semipermeable membrane; and drying the treated composite semipermeable membrane.

The polyfunctional amine component is defined as a polyfunctional amine having two or more reactive amino groups, and includes aromatic, aliphatic, and alicyclic polyfunctional amines.

The aromatic polyfunctional amines include, for example, m-phenylenediamine, p-phenylenediamine, o-phenylenediamine, 1,3,5-triamino benzene, 1,2,4-triamino benzene, 3,5-diaminobenzoic acid, 2,4-diaminotoluene, 2,6-diaminotoluene, N,N'-dimethyl-m-phenylenediamine, 2,4-diaminoanisole, amidol, xylylene diamine etc.

The aliphatic polyfunctional amines include, for example, ethylenediamine, propylenediamine, tris(2-aminoethyl)amine, n-phenylethylenediamine, etc.

The alicyclic polyfunctional amines include, for example, 1,3-diaminocyclohexane, 1,2-diaminocyclohexane, 1,4-diaminocyclohexane, piperazine, 2,5-dimethylpiperazine, 4-aminomethyl piperazine, etc.

These polyfunctional amines may be used independently, and two or more kinds may be used in combination. In order to obtain a skin layer having a higher salt-blocking property, it is preferred to use the aromatic polyfunctional amines.

The polyfunctional acid halide component represents polyfunctional acid halides having two or more reactive carbonyl groups.

The polyfunctional acid halides include aromatic, aliphatic, and alicyclic polyfunctional acid halides.

The aromatic polyfunctional acid halides include, for example trimesic acid trichloride, terephthalic acid dichloride, isophthalic acid dichloride, biphenyl dicarboxylic acid dichloride, naphthalene dicarboxylic acid dichloride, benzenetrisulfonic acid trichloride, benzenedisulfonic acid dichloride, chlorosulfonyl benzenedicarboxylic acid dichloride etc.

The aliphatic polyfunctional acid halides include, for example, propanedicarboxylic acid dichloride, butane dicarboxylic acid dichloride, pentanedicarboxylic acid dichloride, propane tricarboxylic acid trichloride, butane tricarboxylic acid trichloride, pentane tricarboxylic acid trichloride, glutaryl halide, adipoyl halide etc.

The alicyclic polyfunctional acid halides include, for example, cyclopropane tricarboxylic acid trichloride, cyclobutanetetracarboxylic acid tetrachloride, cyclopentane tricarboxylic acid trichloride, cyclopentanetetracarboxylic acid tetrachloride, cyclohexanetricarboxylic acid trichloride, tetrahydrofurantetracarboxylic acid tetrachloride, cyclopentanedicarboxylic acid dichloride, cyclobutanedicarboxylic acid dichloride, cyclohexanedicarboxylic acid dichloride, tetrahydrofuran dicarboxylic acid dichloride, etc.

These polyfunctional acid halides may be used independently, and two or more kinds may be used in combination. In order to obtain a skin layer having higher salt-blocking property, it is preferred to use aromatic polyfunctional acid halides. In addition, it is preferred to form a cross linked structure using polyfunctional acid halides having trivalency or more as at least a part of the polyfunctional acid halide components.

Furthermore, in order to improve performance of the skin layer including the polyamide resin, polymers such as polyvinyl alcohol, polyvinylpyrrolidone, and polyacrylic acids etc., and polyhydric alcohols, such as sorbitol and glycerin, may be copolymerized.

The porous support for supporting the skin layer is not especially limited as long as it has a function for supporting the skin layer, and usually ultrafiltration membrane having micro pores with an average pore size approximately 10 to 500 angstroms may preferably be used. Materials for formation of the porous support include various materials, for example, polyarylether sulfones, such as polysulfones and polyether sulfones; polyimides; polyvinylidene fluorides; etc., and polysulfones and polyarylether sulfones are especially preferably used from a viewpoint of chemical, mechanical, and thermal stability. The thickness of this porous support is usually approximately 25 to 125 μm, and preferably approximately 40 to 75 μm, but the thickness is not necessarily limited to them. The porous support may be reinforced with backing by cloths, nonwoven fabric, etc. The porous support may be wet condition or dry condition.

Processes for forming the skin layer including the polyamide resin on the surface of the porous support is not in particular limited, and any publicly known methods may be used. For example, the publicly known methods include an interfacial condensation method, a phase separation method, a thin film application method, etc. The interfacial condensation method is a method, wherein an amine aqueous solution containing a polyfunctional amine component, an organic solution containing a polyfunctional acid halide component are forced to contact together to form a skin layer by an interfacial polymerization, and then the obtained skin layer is laid on a porous support, and a method wherein a skin layer of a polyamide resin is directly formed on a porous support by the above-described interfacial polymerization on a porous support. Details, such as conditions of the interfacial condensation method, are described in Japanese Patent Application Laid-Open No. 58-24303, Japanese Patent Application Laid-Open No. 01-180208, and these known methods are suitably employable.

In the present invention, it is especially preferred that a covering layer of aqueous solution made from the amine aqueous solution containing a polyfunctional amine components is formed on the porous support, then an interfacial polymerization is performed by contact with an organic solution containing a polyfunctional acid halide component, and the covering layer of aqueous solution, and then a skin layer is formed.

In the interfacial-polymerization method, although the concentration of the polyfunctional amine component in the amine aqueous solution is not in particular limited, the concentration is preferably 0.1 to 5% by weight, and more preferably 0.5 to 2% by weight. Less than 0.1% by weight of the concentration of the polyfunctional amine component may easily cause defect such as pinhole in the skin layer, leading to tendency of deterioration of salt-blocking property. On the other hand, the concentration of the polyfunctional amine component exceeding 5% by weight allows easy permeation of the polyfunctional amine component into the porous support to be an excessively large thickness and to raise the permeation resistance, likely giving deterioration of the permeation flux.

Although the concentration of the polyfunctional acid halide component in the organic solution is not in particular limited, it is preferably 0.01 to 5% by weight, and more preferably 0.05 to 3% by weight. Less than 0.01% by weight of the concentration of the polyfunctional acid halide component is apt to make the unreacted polyfunctional amine component remain, to cause defect such as pinhole in the skin layer, leading to tendency of deterioration of salt-blocking property. On the other hand, the concentration exceeding 5% by weight of the polyfunctional acid halide component is apt to make the unreacted polyfunctional acid halide component remain, to be an excessively large thickness and to raise the permeation resistance, likely giving deterioration of the permeation flux.

The organic solvents used for the organic solution is not especially limited as long as they have small solubility to water, and do not cause degradation of the porous support, and dissolve the polyfunctional acid halide component. For example, the organic solvents include saturated hydrocarbons, such as cyclohexane, heptane, octane, and nonane, halogenated hydrocarbons, such as 1,1,2-trichlorofluoroethane, etc. They are preferably saturated hydrocarbons having a boiling point of 300° C. or less, and more preferably 200° C. or less, or naphthene solvents.

Various kinds of additives may be added to the amine aqueous solution or the organic solution in order to provide easy film production and to improve performance of the composite semipermeable membrane to be obtained. The additives include, for example, surfactants, such as sodium dodecylbenzenesulfonate, sodium dodecyl sulfate, and sodium lauryl sulfate; basic compounds, such as sodium hydroxide, trisodium phosphate, triethylamine, etc. for removing hydrogen halides formed by polymerization; acylation catalysts; compounds having a solubility parameter of 8 to 14 $(cal/cm^3)^{1/2}$ described in Japanese Patent Application Laid-Open No. 08-224452.

The period of time after application of the amine aqueous solution until application of the organic solution on the porous support depends on the composition and viscosity of the amine aqueous solution, and on the pore size of the surface layer of the porous support, and it is preferably 15 seconds or less, and more preferably 5 seconds or less. Application interval of the solution exceeding 15 seconds may allow permeation and diffusion of the amine aqueous solution to a deeper portion in the porous support, and possibly cause a large amount of the residual unreacted polyfunctional amine components in the porous support. In this case, removal of the unreacted polyfunctional amine component that has permeated to the deeper portion in the porous support is probably difficult even with a subsequent membrane washing treatment. Excessive amine aqueous solution may be removed after covering by the amine aqueous solution on the porous support.

In the present invention, after the contact with the covering layer of aqueous solution and the organic solution including the amine aqueous solution, it is preferred to remove the excessive organic solution on the porous support, and to dry the formed membrane on the porous support by heating at a temperature of 70° C. or more, forming the skin layer. Heat-treatment of the formed membrane can improve the mechanical strength, heat-resisting property, etc. The heating temperature is more preferably 70 to 200° C., and especially preferably 100 to 150° C. The heating period of time is preferably approximately 30 seconds to 10 minutes, and more preferably approximately 40 seconds to 7 minutes.

The thickness of the skin layer formed on the porous support is not in particular limited, and it is usually approximately 0.05 to 2 μm, and preferably 0.1 to 1 μm.

In the present invention, a washed composite semipermeable membrane is obtained by subsequently applying membrane washing treatment to the produced composite semipermeable membrane. The method of the membrane washing treatment is not in particular limited, and conventionally publicly known methods are employable. The following membrane washing treatment is especially preferably adopted.

1) Method of washing the membrane by contact of the composite semipermeable membrane with pure water or ion exchange water.

2) Method of washing the membrane by contact of the composite semipermeable membrane with an aqueous solution containing an acidic substance and/or an inorganic salt, and an water-soluble organic substance.

The acidic substance concerned is not in particular limited as long as it is water-soluble, and for example, inorganic acids, such as hydrochloric acid, sulfuric acid, and phosphoric acid; organic acids, such as formic acid, acetic acid, and citric acid, may be mentioned.

The inorganic salt is not in particular limited as long as it is a inorganic salt that can form a complex with an amido group and, for example, lithium chloride (LiCl), calcium chloride $(CaCl_2)$, rhodan calcium $[Ca(SCN)_2]$, and rhodan potassium (KSCN) may be mentioned.

The concentration of the acidic substance and/or the mineral salt in the aqueous solution is preferably 10 ppm to 50% by weight, more preferably 50 ppm to 20% by weight, and especially preferably 1 to 10% by weight. The concentration of the acidic substance and/or the mineral salt less than 10 ppm shows a tendency of making difficult efficient removal of the unreacted polyfunctional amine component from the semipermeable membrane. On the other hand, the concentration exceeding 50% by weight has a great influence on performance of the semipermeable membrane, and shows a tendency for permeation flux to deteriorate.

The water-soluble organic substance is not in particular limited, as long as it does not give adverse effect on membrane performance, and the substance include, for example, monohydric alcohols, such as methyl alcohol, ethyl alcohol, n-propyl alcohol, and isopropyl alcohol; polyhydric alcohols, such as ethylene glycol, triethylene glycol, and glycerin; ethers, such as ethylene glycol monomethyl ether, ethylene glycol monoethyl ether, and ethylene glycol monobutyl ether; polar solvents, such as dimethylformamide, dimethylacetamide, and n-methylpyrrolidone.

In view of the suppression effect of deterioration of removal performance and membrane performance of the unreacted component, the concentration of the water-soluble organic substance in the aqueous solution can be suitably adjusted for every material to be used, and it is approximately 1 to 90% by weight, more preferably 10 to 80% by weight, and especially preferably 20 to 50% by weight. Less than 1% by weight of the concentration of the water soluble organic substance shows a tendency of making difficult efficient removal of the unreacted component from the semipermeable membrane. On the other hand, the concentration exceeding 90% by weight has a great influence on performance of the semipermeable membrane, and shows a tendency for permeation flux to deteriorate.

3) A method of, first of all, making the composite semipermeable membrane contact with a solution including the water soluble organic substance, then making the semipermeable membrane contact with an aqueous solution containing the acidic substance to wash the membrane.

A reversed order of contact with solutions cannot fully remove the unreacted component. Firstly conducted contact of the composite semipermeable membrane with the solution containing the water soluble organic substance can accelerate hydrophilization and swelling of the membrane. Therefore, this process allows quick permeation of the aqueous solution including the acidic substance to an inner portion of the membrane in the subsequent contact treatment, and can increase washing effect.

Furthermore from a viewpoint of permeability into the membrane, the surface tension of the water soluble organic substance is preferably 0.04 N/m or less, and more preferably 0.02 to 0.035 N/m. The surface tension exceeding 0.04 N/m deteriorates permeability into the membrane, and shows a tendency of failing to give sufficient removing effect of the unreacted polyfunctional amine component. However, when a small amount of a water soluble organic substance having a surface tension exceeding 0.04 N/m is used with respect to the water soluble organic substance having a surface tension of 0.04 N/m or less, swelling of the membrane is promoted and washing effect may improve. For example, in case of an aqueous solution containing 50% by weight of ethanol (surface tension: 0.022 N/m), and an aqueous solution containing 40% by weight of ethanol, and 10% by weight of diethylene glycol (surface tension: 0.045 N/m), use of the latter can efficiently remove the unreacted polyfunctional amine component. In the above described case, the same effect may be obtained as in the case where glycerin (surface tension: 0.063 N/m) is used instead of diethylene glycol. The amount of addition of the water soluble organic substance having a surface tension exceeding 0.04 N/m is dependent on the surface tension of the water soluble organic substance to be used, and usually, it is preferably 50 parts by weight or less with respect to 100 parts by weight of the water soluble organic substance having a surface tension of 0.04 N/m or less, and more preferably 30 parts by weight or less.

In consideration of the suppression effect of deterioration of removal performance and membrane performance of the unreacted component, the concentration of the water soluble organic substance in the solution can be suitably adjusted for every materials to be used, and usually, it is 1 to 100% by weight, preferably 10 to 80% by weight, and more preferably 20 to 50% by weight. It is especially preferred to use the aqueous solution having the above described concentration. The concentration of the water soluble organic substance less than 1% by weight shows a tendency of making difficult efficient removal of the unreacted component from the semipermeable membrane.

The concentration of the acidic substance in the aqueous solution is preferably 10 ppm to 50% by weight, more preferably 50 ppm to 20% by weight, and especially preferably 1 to 10% by weight. The concentration of the acidic substance less than 10 ppm shows a tendency of making difficult efficient removal of the unreacted component from the semipermeable membrane. On the other hand, the concentration exceeding 50% by weight has a great influence on the performance of the semipermeable membrane.

In the membrane washing methods 1) to 3) described above, examples of the method of contacting the solution to the composite semipermeable membrane include all methods, such as a dipping, a pressurized water flow, a spray, an application, and a showering, and the dipping and the pressurized water flow methods are preferably used in order to obtain sufficient effect of contacting.

The contact period of time is not limited at all within a range acceptable by an allowable content of the unreacted component in the composite semipermeable membrane after the membrane washing treatment, and manufacturing restrictions, and any period of time may be adopted. Although the contact period of time cannot necessarily be specified, it is usually several seconds to tens of minutes, and preferably 10 seconds to 3 minutes. Since the amount of removal of the unreacted component reaches an equilibrium, removing effect does not necessarily improve even with longer contact period of time. When the contact period of time is excessively lengthened, there is conversely shown a tendency for the membrane performance and manufacturing efficiency to deteriorate. Although the contact temperature in particular will not be limited as long as the solution is in a temperature range allowing existence as a liquid, from a view point of removing effect of the unreacted component, of prevention of the membrane from deterioration, and of easiness of treatment etc. the contact temperature is preferably 10 to 90° C., more preferably 10 to 60° C., and especially preferably 10 to 45° C.

In the contact of the solution by the pressurized water flow method, the pressure is not in particular limited, as long as the pressure in use of this solution with respect to the semipermeable membrane is in a range acceptable by the semipermeable membrane and the physical strength of the members and the equipment for pressure application. The pressurized water flow is preferably performed at 0.1 to 10 MPa, and more preferably at 1.5 to 7.5 MPa. The pressurized water flow at a pressure less than 0.1 MPa shows a tendency of extending the contact period of time, in order to obtain necessary effect. And when exceeding 10 MPa, compaction caused by the pressure is apt to decrease the permeation flux.

4) Method of immersing the composite semipermeable membrane into a liquid, and conducting an ultrasonic membrane washing.

The liquid in which the semipermeable membrane is to be immersed is not in particular limited as long as it is a liquid that does not deteriorate the performance of the semipermeable membrane, and for example, aqueous solutions including organic solvent, distilled water, ion exchange water, organic substance, and inorganic substance may be used. It is especially preferred to use aqueous solutions containing alcohols, acids, or alkalis.

The alcohols include, for example, monohydric alcohols, such as methyl alcohol, ethyl alcohol, n-propyl alcohol, and isopropyl alcohol; polyhydric alcohols, such as ethylene glycol, diethylene glycol, triethylene glycol, and glycerin. These may be used independently and two or more kinds may be used in combination.

In consideration of removal performance of the unreacted component and the suppression effect of deterioration of the membrane performance, the alcohol concentration in the aqueous solution can be suitably adjusted for every material to be used, usually, it is approximately 1 to 90% by weight, more preferably 10 to 80% by weight, and especially preferably 20 to 50% by weight. Since the concentration less than 1% by weight of the alcohol does not allow sufficient swelling of the semipermeable membrane, it shows a tendency for synergistic effect with ultrasonic cleaning not to fully be obtained. On the other hand, the concentration exceeding 90% by weight has a great influence on performance of the semipermeable membrane, and shows a tendency for salt-blocking rate and permeation flux to deteriorate.

The acid to be used is not in particular limited, if it is a water-soluble acid, and for example, inorganic acids, such as hydrochloric acid, sulfuric acid, and phosphoric acid; organic acids, such as formic acid, acetic acid, and citric acid, may be mentioned.

The alkali to be used is not in particular limited, if it is a water-soluble alkali, and for example, alkali metal hydroxides, such as sodium hydroxide and potassium hydroxide, alkaline earth metal hydroxides, such as calcium hydroxide, ammonia, amines, may be mentioned.

In consideration of removal performance of the unreacted component and the suppression effect of deterioration of the membrane performance, the concentration of the acid or the alkali in the aqueous solution can be suitably adjusted for every material to be used, it is preferably 10 ppm to 50% by weight, more preferably 50 ppm to 20% by weight, and especially preferably 1 to 10% by weight. Since the concentration less than 10 ppm of the acid or the alkali does not allow sufficient swelling of the semipermeable membrane, it shows a tendency for synergistic effect with ultrasonic cleaning not to fully be obtained. On the other hand, the concentration exceeding 50% by weight has a great influence on performance of the semipermeable membrane, and shows a tendency for salt-blocking rate and permeation flux to deteriorate.

The temperature of the liquid in which the semipermeable membrane is to be immersed is not in particular limited, in consideration of removal performance of the unreacted component, the suppression effect of deterioration of the membrane performance, easiness of treatment, etc., it is preferably 10 to 90° C., more preferably 10 to 60° C., and especially preferably 10 to 45° C.

In consideration of removal performance of the unreacted component and the suppression effect of deterioration of the membrane performance, the period of time needed for washing by supersonic wave can be suitably adjusted for every materials to be used, and it is usually several seconds several minutes, and preferably 10 seconds to 3 minutes. Since the amount of removal of the unreacted component reaches equilibrium, an excessively long washing period does not further improve removing effect, and an excessively long washing period shows a tendency for the membrane performance, or manufacturing efficiency to decrease.

In the present invention, subsequently a moisturing treatment is performed by contact of a moisturing solution including a moisturizer and a hydrophilization agent only to the surface of the porous support of the composite semipermeable membrane washed in the method described above, and by contact of a protecting solution only to the surface of the skin layer of the washed composite semipermeable membrane, and thus a protective layer is formed on the skin layer.

The moisturing treatment is performed by supplying the moisturing solution only to the surface of the porous support. In detail, a method of immersing the washed composite semipermeable membrane in the moisturing solution in a state the surface of the skin layer contacted with a roll, a transfer method such as a photogravure method, an applying method, and spray method, etc., may be mentioned. The methods to be used are not limited to the above-described methods, and any known methods are employable. Optionally, a removal operation of the excessive moisturing solution may be combined after supply of the moisturing solution. The removal operation includes, for example, a contact type removal method with blade, or rolls made of plastics, rubbers, etc., a non-contact type removal method with an air knife, etc.

The moisturizer is not in particular limited as long as it is a compound that can give moisture retention to the washed composite semipermeable membrane, and it includes, for example, organic acid alkali metal salts, such as sodium acetate, potassium acetate, sodium lactate, potassium lactate, sodium glutamate, and potassium glutamate; organic acid alkaline earth metal salts, such as magnesium acetate, calcium acetate, magnesium lactate, calcium lactate, magnesium glutamate, and calcium glutamate; inorganic acid alkaline metal salts, such as sodium hydrogencarbonate, potassium hydrogencarbonate, sodium carbonate, potassium carbonate, disodium monohydrogen phosphate, dipotassium monohydrogen phosphate, monosodium dihydrogen phosphate, monopotassium dihydrogen phosphate, sodium phosphate, potassium phosphate; inorganic acid alkaline earth metal salts, such as magnesium hydrogencarbonate, calcium hydrogencarbonate, magnesium carbonate, calcium carbonate, magnesium primary phosphate, calcium primary phosphate, magnesium secondary phosphate, calcium secondary phosphate, magnesium tertiary phosphate, calcium tertiary phosphate: alkali metal halides, such as sodium chloride; alkali earth metal halides, such as magnesium chloride; surfactants, such as sodium lauryl sulfate, lauryl potassium sulfate, sodium alkyl benzene sulfonate, and potassium alkylbenzene sulfonate; saccharides, such as glucose and saccharose; amino acids, such as glycine and leucine etc. These may be used independently and two or more kinds may be used in combination.

The concentration of the moisturizer in the solution is not in particular limited, and it is preferably 100 ppm to 30% by weight, and more preferably 500 ppm to 10% by weight. The concentration of the moisturizer less than 100 ppm cannot provide sufficient deterioration suppression effect of water permeability and salt-blocking rate after a drying treatment, and shows a tendency for a moisturing treatment period to be prolonged. On the other hand, the concentration of the moisturizer exceeding 30% by weight raises costs, and shows a tendency to have an adverse effect on membrane performance.

Solvents of the moisturing solution are not in particular limited as long as performance of the membrane is reduced, and the solvents include, for example, organic solvents, distilled water, ion exchanged water, etc.

In order to promote permeation into the porous support, hydrophilization agents, such as surfactants and alcohols, for improving hydrophilic property are added to moisturing solution. Addition of alcohol is preferred when deterioration of water penetration performance by absorption is taken into consideration. Furthermore, antifungal agents, antioxidants, anti-bacteria agents, etc. that do not hamper moisturizing function may suitably be added.

Surfactants include, for example, sodium lauryl sulfate, potassium lauryl sulfate, sodium alkylbenzene sulfonate, and potassium alkyl benzene sulfonate. Alcohols include, for example, monohydric alcohols, such as methyl alcohol, ethyl alcohol, n-propyl alcohol, and isopropyl alcohol; and polyhydric alcohols, such as ethylene glycol, diethylene glycol, triethylene glycol, and glycerin.

The concentration of the surfactants or alcohols is not in particular limited, and it is preferably 1% by weight or more, more preferably 5 to 80% by weight, and especially preferably 10 to 50% by weight. Less than 1% by weight of the concentration of the surfactants or alcohols makes difficult permeation of the moisturing solution to the surface by the side of the skin layer of the porous support, thereby causing easy deterioration of water permeability of the dried composite semipermeable membrane.

The temperature of the moisturing solution is not in particular limited as long as in a temperature range that allows existence of the solution as a liquid, in consideration of moisture retention effect, prevention of the membrane from degradation, ease of treatment, and the like, it is preferably 10 to 90° C., more preferably 10 to 60° C., and especially preferably 10 to 45° C.

The immersion period is not in particular limited in immersion of the washed composite semipermeable membrane into the moisturing solution, and it is preferably 0.1 seconds to 30 minutes, and more preferably 1 second to 10 minutes. The immersion period less than 0.1 second shows a tendency for the sufficient deterioration suppression effect of water permeability and salt-blocking rate after a drying treatment. On the other hand, the immersion period exceeding 30 minutes cannot vary deterioration suppression effect of water permeability and salt-blocking rate after a drying treatment, and disadvantageously deteriorate the manufacturing efficiency.

In application of the moisturing solution on the surface of the porous support, the amount of application is preferably 10 to 100 cc/m², and more preferably 30 to 80 cc/m². The amount of application less than 10 cc/m² shows a tendency not to allow sufficient water permeability and inhibitory effect of impairment in salt-blocking rate after drying treatment. On the other hand, the amount of application exceeding 100 cc/m² does not improve water permeability and inhibitory effect of impairment in salt-blocking rate after drying treatment for increase of the amount, leading to deterioration in subsequent disadvantageous drying efficiency.

On the other hand, formation of the protective layer is performed by supplying the protecting solution only to the surface of the skin layer of the washed composite semipermeable membrane. In detail, a method of immersing the washed composite semipermeable membrane in the protecting solution in a state the surface of the porous support contacted with a roll, a transfer method such as a photogravure method, an applying method, and spray method, etc., may be mentioned. The methods to be used are not limited to the above-described methods, and any known methods are employable. Optionally, a removal operation of the excessive protecting solution may be combined after supply of the moisturing solution. The removal operation includes, for example, a contact type removal method with blade, or rolls, made of plastics, rubbers, etc., a non-contact type removal method with an air knife, etc.

Although as long as the protective agent included in the protecting solution is a compound insoluble in water, it will not be in particular limited, electrically neutral organic substances having a cationic group and an anionic group and organic substances having a nonionic hydrophilic group are preferably used.

Organic substances having a nonionic hydrophilic group include, for example, polyvinyl alcohols, saponified polyethylene-vinyl acetate copolymers, polyvinyl pyrrolidones, hydroxy propyl celluloses, polyethylene glycols, etc. These may be used independently and two or more kinds may be used in combination. Polyvinyl alcohols are especially preferably used among them.

Solvents of the protecting solution are not in particular limited as long as they do not impair the performance of the skin layer. For example, examples thereof include water; aliphatic alcohols, such as methanol, ethanol, propanol, and butanol; lower alcohols, such as methoxy methanol and methoxy ethanol; halogenated aliphatic alcohols, such as ethylene chlorohydrin; aliphatic hydrocarbons, such as hexane and heptane; ketones, such as acetone; and acetonitrile; and mixtures thereof. In the case of use by mixing of water with the alcohols, an amount of 10% by weight or more of the alcohols is preferably used, and more preferably 30% by weight or more.

The concentration of the protective agent is not in particular limited, and it is preferably 0.01 to 20% by weight, more preferably 0.05 to 5% by weight, and especially preferably 0.1 to 1% by weight.

The thickness of the protective layer after drying is preferably 0.001 to 1 μm. The thickness less than 0.001 μm provides insufficient improvement effect of contamination resistance and durability, and the thickness more than 1 μm shows tendency to reduce water permeability.

The step of contact of the moisturing solution only to the surface of the porous support of the washed composite semipermeable membrane and the step of contact of the protecting solution only to the surface of the skin layer of the washed composite semipermeable membrane may be performed simultaneously, and either step may be performed in advance. In order to enable permeation of the sufficient amount of the moisturing solution in the porous support, the moisturing treatment is preferably performed in advance.

In the present invention, the treated composite semipermeable membrane, to which moisturization and protection treatment has been applied by the process described above after that, is dried to prepare a dried composite semipermeable membrane.

The temperature of drying treatment is not in particular limited, and it is preferably 20 to 200° C., and more preferably 50 to 150° C. The temperature less than 20° C. needs an excessively long drying treatment period, and likely gives insufficient drying. The temperature exceeding 200° C. shows a tendency to cause decrease of membrane performance due to structural change of the membrane caused by heat.

The period of the drying treatment is not in particular limited, and it is preferred that drying is performed until the amount of solvents in the dried composite semipermeable membrane is 5% by weight or less.

The dried composite semipermeable membrane produced by such a process, has an extremely small content of unreacted components. And thereby, permeated liquids separated and refined, or target compounds condensed by use of the composite semipermeable membrane etc. have an extremely small amount of impurities, therefore have an extremely high purity. The dried composite semipermeable membrane of the present invention has outstanding workability and preservability since it is a dry type membrane. Furthermore, the dried composite semipermeable membrane of the present invention exhibits water permeability and salt-blocking rate equivalent to those of wet type composite semipermeable membranes, though it is a dry type membrane. Since the dried composite semipermeable membrane of the present invention has the protective layer on the skin layer, even in the case of treatment of raw water including various membrane contamination substances that may cause deterioration of the permeate flow rate, it enables stable long-term operation, also allowing reduction of damage to the skin layer in the case of preparation of the membrane module.

For improvement in salt-blocking property, water permeability, anti-oxidation agent property, etc., of the dried composite semipermeable membrane, various conventionally publicly known treatments may be applied.

EXAMPLE

The present invention will, hereinafter, be described with reference to Examples, but the present invention is not limited at all by these Examples.
(Measurement of Permeation Flux and Salt-Blocking Rate)

A dried composite semipermeable membrane produced with a shape of a flat film is cut into a predetermined shape and size, and is set to a cell for flat film evaluation. An aqueous solution containing NaCl of about 1500 mg/L and adjusted to a pH of 6.5 to 7.5 with NaOH was forced to contact to a supply side, and a permeation side of the membrane at a differential pressure of 1.5 MPa at 25° C. A permeation velocity and an electric conductivity of the permeated water obtained by this operation were measured for, and a permeation flux ($m^3/m^2 \cdot d$) and a salt-blocking rate (%) were calculated. The correlation (calibration curve) of the NaCl concentration and the electric conductivity of the aqueous solution was beforehand made, and the salt-blocking rate was calculated by a following equation.

Salt-blocking rate (%)={1−(NaCl concentration [mg/L] in permeated liquid)/(NaCl concentration [mg/L] in supply solution)}×100

(Durability Evaluation)

A channel material for raw water made of a polypropylene fiber, which is a modular component, disposed in a grid shape is laminated on the skin layer of the dried composite semipermeable membrane, and the channel material was made to slide 5 times on the skin layer with 100 g of load applied thereto on the channel material for the raw water. Subsequently, a salt-blocking rate was measured for by the same process as described above.

Production Example 1

Production of Porous Support

A dope for manufacturing a membrane containing 18% by weight of a polysulfone (produced by Solvay, P-3500) dissolved in N,N-dimethylformamide (DMF) was uniformly applied so that it might give 200 μm in thickness in wet condition on a nonwoven fabric base material. Subsequently, it was immediately solidified by immersion in water at 40 to 50° C., and DMF as a solvent was completely extracted by washing. Thus a porous support having a polysulfone microporous layer was produced on the nonwoven fabric base material.

Example 1

An aqueous solution of amines containing 1% by weight of m-phenylenediamine, 3% by weight of triethylamine, and 6% by weight of camphorsulfonic acid was applied on a porous support and, an excessive amount of the amine aqueous solution was removed by wiping to form a covering layer of an aqueous solution. Subsequently, an isooctane solution containing 0.2% by weight of trimesic acid chloride was applied to the surface of the covering layer of the aqueous solution. Subsequently, the excessive solution was removed, the material was kept standing for 3 minutes in a hot air dryer at 120° C. to form a skin layer containing a polyamide resin on the porous support, and thus an unwashed composite semipermeable membrane was obtained. After that time, the unwashed composite semipermeable membrane was immersed in pure water at 50° C. for 10 minutes for membrane washing treatment to produce a washed composite semipermeable membrane. Then, 5% by weight of a sodium acetate aqueous solution (solvent: isopropyl alcohol/water=3/7) was applied on the surface of the porous support of the washed composite semipermeable membrane in an amount of 50 cc/m². Next, 0.3% by weight a polyvinyl alcohol aqueous solution (degree of saponification: 99%, average polymerization degree: 2000, solvent: isopropyl alcohol/water=3/7) was applied on the surface of the skin layer of the washed composite semipermeable membrane in an amount of 50 cc/m². Subsequently, the composite semipermeable membrane was dried for 5 minutes at 130° C. to produce a dried composite semipermeable membrane. The results of permeation examination are shown in table 1.

Examples 2 to 13

Under conditions shown in table 1, dried composite semipermeable membranes were produced in the same manner as in example 1. The results of permeation examination are shown in table 1.

Comparative Example 1

A dried composite semipermeable membrane was produced in the same manner as in example 1, except for not applying 5% by weight of a sodium acetate aqueous solution to the surface of the porous support of the washed composite semipermeable membrane. The results of permeation examination are shown in table 1.

Comparative Example 2

A dried composite semipermeable membrane was produced in the same manner as in example 1, except for not applying 0.3% by weight of the polyvinyl alcohol aqueous solution to the surface of the skin layer of the washed composite semipermeable membrane. The results of permeation examination are shown in table 1.

Comparative Example 3

A dried composite semipermeable membrane was produced in the same manner as in example 1, except for using 5% by weight of a sodium lactate aqueous solution (solvent: water) instead of 5% by weight of a sodium acetate aqueous solution in example 1. The results of permeation examination are shown in table 1.

Comparative Example 4

A washed composite semipermeable membrane was produced in the same manner as in example 1. Subsequently, the washed composite semipermeable membrane was immersed into 5% by weight of a sodium lactate aqueous solution (solvent: isopropyl alcohol/water=3/7). Next, 0.3% by weight of a polyvinyl alcohol aqueous solution (a degree of saponification: 99%, average polymerization degree: 2000, solvent: isopropyl alcohol/water=3/7) was applied to the surface of the skin layer of the composite semipermeable membrane in an amount of 50 cc/m². Subsequently, the composite semipermeable membrane was dried for 5 minutes at 130° C. to produce a dried composite semipermeable membrane. The results of permeation examination are shown in table 1.

TABLE 1

| | Moisturing treatment | | | Protection treatment (formation of protective layer) | | Permeation examination | | |
|---|---|---|---|---|---|---|---|---|
| | Moisturizer | Hydrophilization agent | Treatment method | Protective agent | Treatment method | Salt-blocking rate (%) | Permeation flux (m³/m²·d) | Salt-blocking rate after friction examination (%) |
| Example 1 | Sodium acetate | Isopropyl alcohol | Application only to support side | Polyvinyl alcohol | Application only to skin layer side | 99.6 | 0.4 | 99.5 |
| Example 2 | | | | | | 99.5 | 0.4 | 99.4 |
| Example 3 | | | | | | 99.4 | 0.6 | 99.4 |
| Example 4 | | | | | | 99.4 | 0.5 | 99.4 |
| Example 5 | Sodium lactate | | | | | 99.5 | 0.4 | 99.5 |
| Example 6 | | | | | | 99.5 | 0.5 | 99.5 |
| Example 7 | | | | | | 99.4 | 0.5 | 99.4 |
| Example 8 | | | | | | 99.3 | 0.4 | 99.3 |
| Example 9 | | | | | | 99.6 | 0.5 | 99.5 |
| Example 10 | | | | | | 99.5 | 0.5 | 99.5 |
| Example 11 | | | | | | 99.4 | 0.4 | 99.3 |
| Example 12 | | | | | | 99.4 | 0.6 | 99.3 |
| Example 13 | | | | | | 99.5 | 0.4 | 99.5 |
| Comparative example 1 | — | — | — | — | — | 96.0 | 0.1 | 95.8 |
| Comparative example 2 | Sodium lactate | Isopropyl alcohol | Application only to support side | — | — | 99.4 | 0.7 | 97.9 |
| Comparative example 3 | — | — | | Polyvinyl alcohol | Application only to skin layer side | 97.1 | 0.1 | 97.0 |
| Comparative example 4 | | Isopropyl alcohol | Immersion (both sides) | | | 99.3 | 0.7 | 98.7 |

As is clearly shown in table 1, beforehand application of a moisturing treatment only to a side of the support of the washed composite semipermeable membrane and formation of a protective layer on the surface of the skin layer can provide a dried composite semipermeable membrane having outstanding water permeability and salt-blocking rate after drying treatment, and outstanding durability.

What is claimed is:

1. A process for producing a dried composite semipermeable membrane comprising:
    preparing a composite semipermeable membrane comprising:
        a porous support; and
        a skin layer including a polyamide resin obtained by reaction between a polyfunctional amine component and a polyfunctional acid halide component formed on a surface of the porous support, wherein a first surface of the composite semipermeable membrane contains the skin layer and a second surface of the composite semipermeable membrane contains the porous support;
    preparing a washed composite semipermeable membrane by washing the composite semipermeable membrane;
    preparing a treated composite semipermeable membrane by contact of a moisturizing solution including a moisturizer and a hydrophilization agent only to the second surface of the washed composite semipermeable membrane and by contact of a protecting solution only to the first surface the washed composite semipermeable membrane; and
    drying the treated composite semipermeable membrane.

2. The process of claim 1, wherein the moisturizer is selected from the group consisting of an organic acid alkali metal salt, an organic acid alkaline earth metal salt, an inorganic acid alkali metal salt, an inorganic acid alkaline earth metal salt, an alkali metal halide, an alkali earth metal halide, a surfactant, a saccharide, an amino acid, and a combination thereof.

3. The process of claim 1, wherein the moisturizer is an organic acid metal salt and/or an inorganic acid metal salt.

4. The process of claim 1, wherein the moisturizer is selected from the group consisting of sodium acetate, potassium acetate, sodium lactate, potassium lactate, sodium glutamate, potassium glutamate, magnesium acetate, calcium acetate, magnesium lactate, calcium lactate, magnesium glutamate, calcium glutamate, sodium hydrogencarbonate, potassium hydrogencarbonate, sodium carbonate, potassium carbonate, disodium monohydrogen phosphate, dipotassium monohydrogen phosphate, monosodium dihydrogen phosphate, monopotassium dihydrogen phosphate, sodium phosphate, potassium phosphate, magnesium hydrogencarbonate, calcium hydrogencarbonate, magnesium carbonate, calcium carbonate, magnesium primary phosphate, calcium primary phosphate, magnesium secondary phosphate, calcium secondary phosphate, magnesium tertiary phosphate, calcium tertiary phosphate, sodium chloride, magnesium chloride, sodium lauryl sulfate, lauryl potassium sulfate, sodium alkyl benzene sulfonate, potassium alkylbenzene sulfonate, glucose, saccharose, glycine, leucine, and a combination thereof.

5. The process of claim 1, wherein the hydrophilizing agent is selected from the group consisting of a surfactant, an alcohol, and a combination thereof.

6. The process of claim 1, wherein the hydrophilizing agent is selected from the group consisting of sodium lauryl sulfate, potassium lauryl sulfate, sodium alkylbenzene sulfonate, potassium alkyl benzene sulfonate, methyl alcohol, ethyl alcohol, n-propyl alcohol, isopropyl alcohol, ethylene glycol, diethylene glycol, triethylene glycol, glycerin, and a combination thereof.

7. The process of claim 1, wherein the protecting solution comprises a protective agent selected from the group consisting of an electrically neutral organic substance having a cationic group and an anionic group, an organic substance having a nonionic hydrophilic group, and a combination thereof.

8. The process of claim 7, wherein the protecting solution contains 0.01% to 20% by weight protecting agent.

9. The process of claim 1, wherein the protecting solution comprises a protective agent selected from the group consisting of a polyvinyl alcohol, a saponified polyethylene-vinyl acetate copolymer, a polyvinyl pyrrolidone, a hydroxy propyl cellulose, a polyethylene glycol, and a combination thereof.

10. The process of claim 1, wherein the moisturizing solution contains 5% to 80% by weight hydrophilization agent.

11. The process of claim 10, wherein the moisturizing solution contains 10% to 80% by weight hydrophilization agent.

12. The process of claim 1, wherein the moisturizing solution contains 100 ppm to 30% by weight moisturizer.

13. The process of claim 1, wherein the composite semipermeable membrane comprises a protective layer having a thickness of 0.001 μm to 1 μm on the first surface of the composite semipermeable membrane after drying.

14. A method for producing a composite semipermeable membrane comprising:

providing a washed composite semipermeable membrane comprising:
  a porous support; and
  a skin layer including a polyamide resin obtained by reaction between a polyfunctional amine component and a polyfunctional acid halide component formed on a surface of the porous support,
  wherein a first surface of the composite semipermeable membrane contains the skin layer and a second surface of the composite semipermeable membrane contains the porous support, and
  said washed composite semipermeable membrane having been washed subsequent to formation of the skin layer;

contacting only the second surface of the washed composite semipermeable membrane with a moisturizing solution comprising a moisturizer and a hydrophilization agent;

contacting only the first surface of the washed composite semipermeable membrane with a protecting solution; and drying the composite semipermeable membrane after contact with the moisturizing solution and protecting solution, whereby the dried composite semipermeable membrane possesses increased durability when compared to a composite semipermeable membrane produced by a method in which both the first and second surfaces of the washed composite semipermeable membrane are contacted with the moisturizing solution.

* * * * *

UNITED STATES PATENT AND TRADEMARK OFFICE
CERTIFICATE OF CORRECTION

PATENT NO.        : 8,518,310 B2                                    Page 1 of 1
APPLICATION NO.   : 11/869568
DATED             : August 27, 2013
INVENTOR(S)       : Koumoto et al.

It is certified that error appears in the above-identified patent and that said Letters Patent is hereby corrected as shown below:

On the Title Page
   Column 2 (page 2, item 56) at line 40, Under Other Publications, change "2000710180103.0," to --200710180103.0,--.

In the Specification
   Column 9 at line 66, Change "range 15" to --range--.

In the Claims
   Column 17 at line 58, In Claim 1, change "surface the" to --surface of the--.

Signed and Sealed this
Third Day of June, 2014

Michelle K. Lee
*Deputy Director of the United States Patent and Trademark Office*